United States Patent [19]

Kelly et al.

[11] 4,417,335

[45] Nov. 22, 1983

[54] DIGITAL SATELLITE TELEPHONE OFFICE

[75] Inventors: Michael J. Kelly, Scottsdale; Robert L. Lindsay, Phoenix, both of Ariz.; Alex W. Kobylar, Chicago; David J. Stelte, Wheaton, both of Ill.

[73] Assignee: GTE Automatic Electric Labs Inc., Northlake, Ill.

[21] Appl. No.: 323,345

[22] Filed: Nov. 20, 1981

Related U.S. Application Data

[63] Continuation-in-part of Ser. No. 105,344, Dec. 19, 1979, abandoned.

[51] Int. Cl.³ .......................... H04J 3/12; H04Q 11/04
[52] U.S. Cl. .................................. 370/110.1; 370/58; 370/56; 179/18 AD
[58] Field of Search ................... 370/110.1, 110.4, 58, 370/56; 179/18 ES, 18 AD

[56] References Cited

U.S. PATENT DOCUMENTS

| | | | |
|---|---|---|---|
| 3,697,701 | 10/1972 | Greason | 179/18 AD |
| 3,740,485 | 6/1973 | Nickerson | 179/18 AD |
| 3,787,631 | 1/1974 | Lewis | 179/18 AD |
| 3,922,495 | 11/1975 | Donohoe | 370/110.1 |
| 3,993,873 | 11/1976 | Bogda et al. | 179/18 AD |

OTHER PUBLICATIONS

"GTD-S Eax a Family of Digital Switches"; by Esperseth et al.; GTE Automatic Electric Journal; Sep. 1979; pp. 150–154.

*Primary Examiner*—Douglas W. Olms
*Attorney, Agent, or Firm*—Gregory G. Hendricks; Robert J. Black

[57] ABSTRACT

A 4 KHz channel is used for communication between a processing unit associated with a satellite telephone office and a processing unit associated with a connected class 5 telephone office. A data link circuit is connected to the processing unit of the satellite office and operates to transmit data communications between the processing unit of the satellite office and the class 5 telephone office via the 4 KHz channel.

10 Claims, 22 Drawing Figures

DIGITAL SATELLITE TELEPHONE OFFICE

This application is a continuation-in-part of our application Ser. No. 105,344, filed on Dec. 19, 1979, (now abandoned).

BACKGROUND OF THE INVENTION

(1) Field of the Invention

The present invention relates to digital telephone offices and more particularly to a satellite digital telephone office connected to a base unit (e.g. class 5) digital telephone office. The satellite office operates to provide minimal features for local switching independent of the class 5 office and by communication with the base unit office the satellite office can provide the full range of customer features associated with a class 5 office.

(2) Description of the Prior Art

In order to provide telephone subscribers with the full range of class 5 customer features they traditionally had to be connected to a full capability class 5 telephone office. Due to cost limitations such services are not provided to rural customers. Traditionally rural subscribers were connected to a small analog telephone office which could only provide minimal telephone service with no custom call features. To provide full feature telephone service to rural subscribers, such small analog office would have to provide a foreign exchange (FX) trunk to a full feature telephone office.

Accordingly it is an object of the present invention to provide rural telephone subscribers with full feature class 5 telephone service at an economical cost. An additional feature of the present invention is automatic maintenance of the satellite office.

SUMMARY OF THE INVENTION

The present invention provides rural telephone subscribers with full feature class 5 telephone service through use of a digital satellite telephone office connected to a remote class 5 telephone office.

The satellite office includes subscriber line circuits connected to a processing unit and to a digital network. The processing unit is further connected to a data link circuit. A digital trunk circuit is connected between the digital network and the data link circuit which is further connected to a unipolar/bipolar conversion circuit. The conversion circuit is further connected to an associated class 5 telephone office.

When a subscriber station goes off-hook, its associated line circuit informs the processing unit of the change in line status. The processing unit operates in response to this information to generate a request for service to the connected class 5 office. This communication between satellite and class 5 office is via a 4 KHz channel. The communication facility is a T1 line which transmits 24 channels of information in each 125 microsecond period. A framing bit is associated with each frame of 24 channels of information. The framing bit associated with odd numbered frames is designated as the terminal framing bit (FT) and is used to provide a code for synchronization between the satellite office and the class 5 office. The framing bit associated with even numbered frames is designated as the supervision framing bit (FS) and is used to provide a code for identifying every 6th frame. These frames must be identified in the standard T1 signaling format since the 8th bit of each 8 bit channel in each 6th frame is used to transmit supervisory signals for that channel. However such supervision bits can only be used to provide predetermined status and control signals for that channel.

In order to provide full communication capability between the satellite office and the class 5 office the pattern for sending such supervision signals was changed to an out of band format in the present invention. If supervisory signals are not transmitted in a predetermined bit of a predetermined frame the supervisory framing bit, FS, need not be used to identify such frames. Therefore, this bit can be used to transfer information directly. Since this bit occurs every other frame, it occurs once every 250 microseconds or at a 4 KHz rate. Using this 4 KHz channel, the satellite central processor informs the class 5 office as to which line went offhook, so that the class 5 office can determine the required class of service. The class 5 office will then communicate, via a similar 4 KHz channel, the information concerning call setup functions, such as whether coin test must be performed or a TCMF receiver must be connected, etc. Upon collection of digits the satellite office will transmit this information to the class 5 office, which will then determine the required routing, and if termination is to be at the satellite, it will communicate the required termination instructions via this 4 KHz channel to the satellite processing unit.

Thus the call processing functions are performed in the class 5 telephone office while the call origination, termination and connection functions are performed in the satellite office. Since the satellite office need only provide equipment to perform such limited functions, they can be provided at an economical cost for rural subscribers. Also, since the satellite office can make local connections, basic telephone service can be provided to the rural subscribers via the satellite office even if communication to the class 5 telephone office is interrupted. As long as communication links are maintained to the class 5 telephone office, full feature telephone services (including custom calling features) can be provided via this communication link to rural subscribers.

DESCRIPTION OF THE PREFERRED EMBODIMENT

Figure 1:
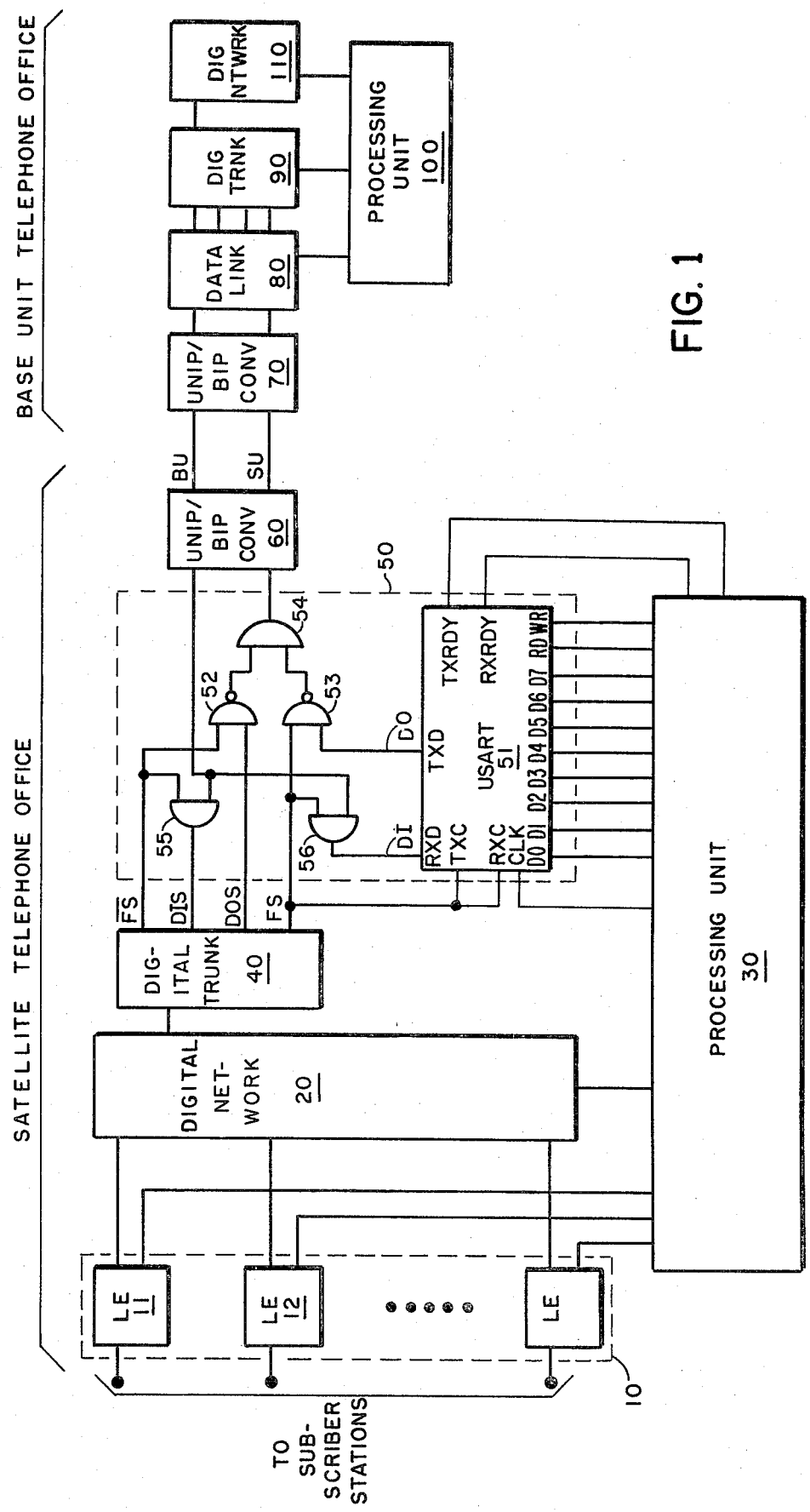
FIG. 1 is a block diagram of a digital satellite telephone communication system in accordance with the present invention.
Figure 2:
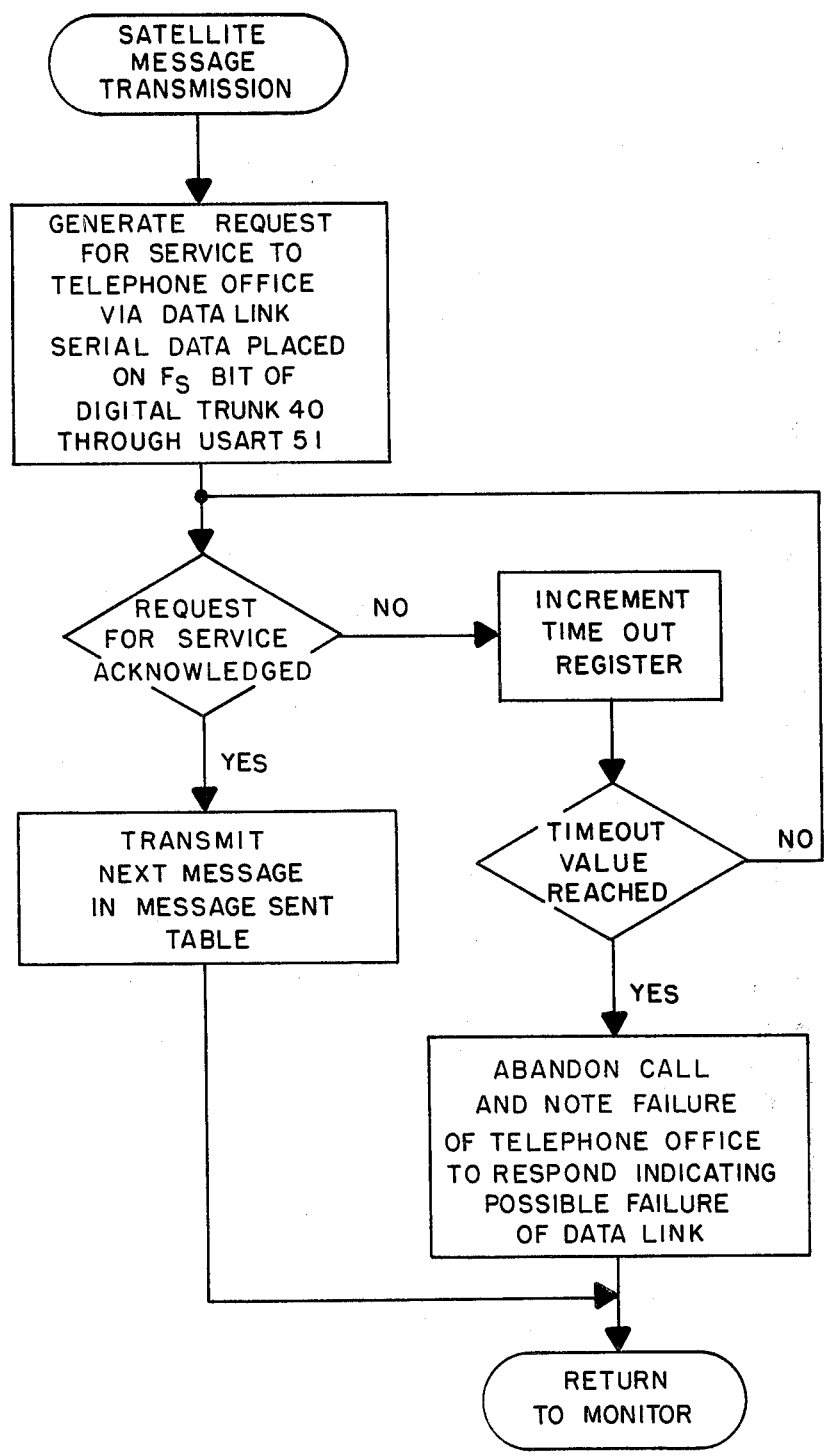
FIGS. 2–9 are flow charts showing the software operations of the satellite telephone office shown in FIG. 1.
Figure 3:
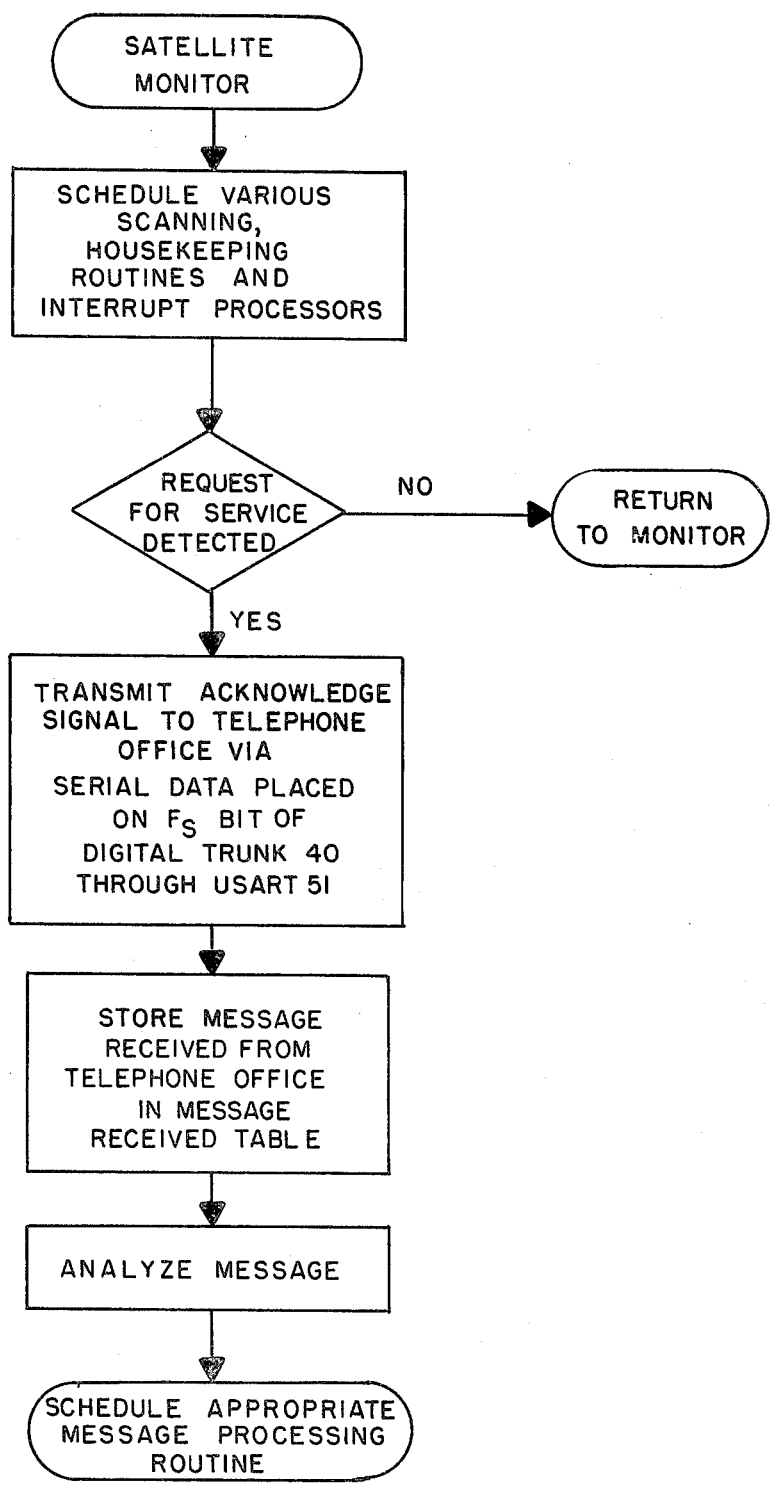
Figure 4:
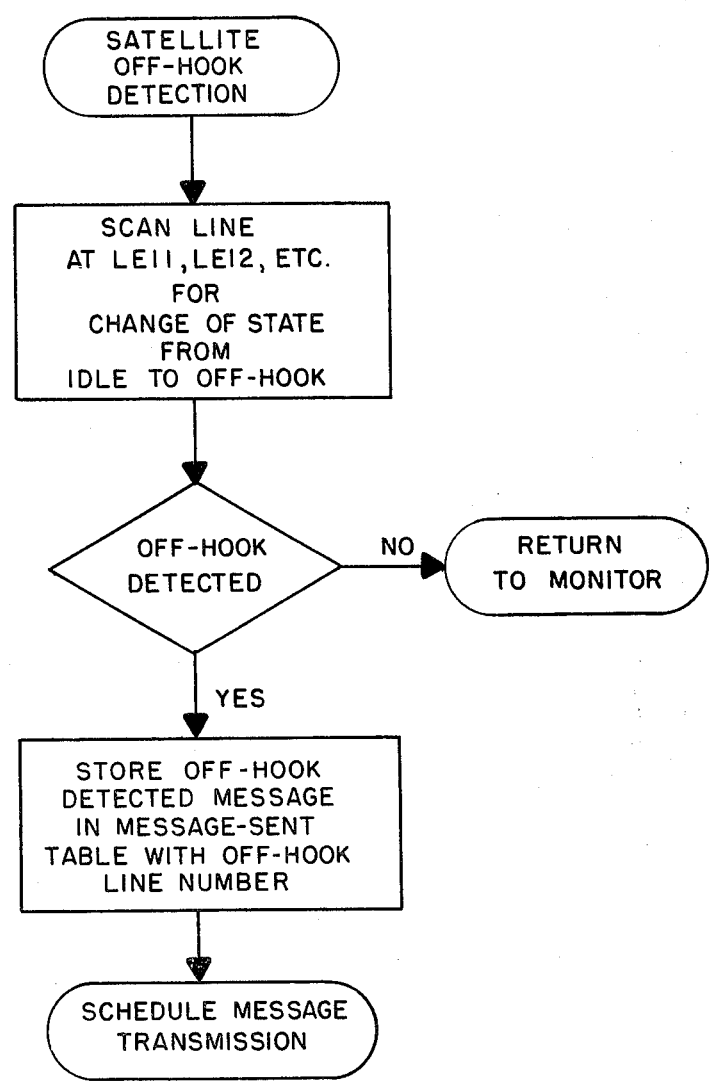
Figure 5:
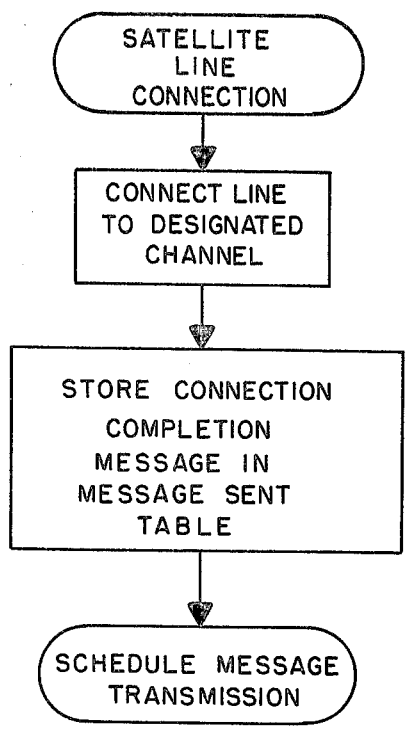
Figure 6:
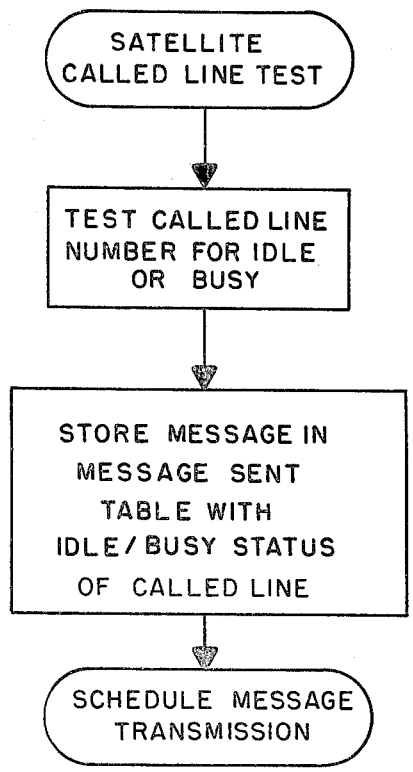
Figure 7:
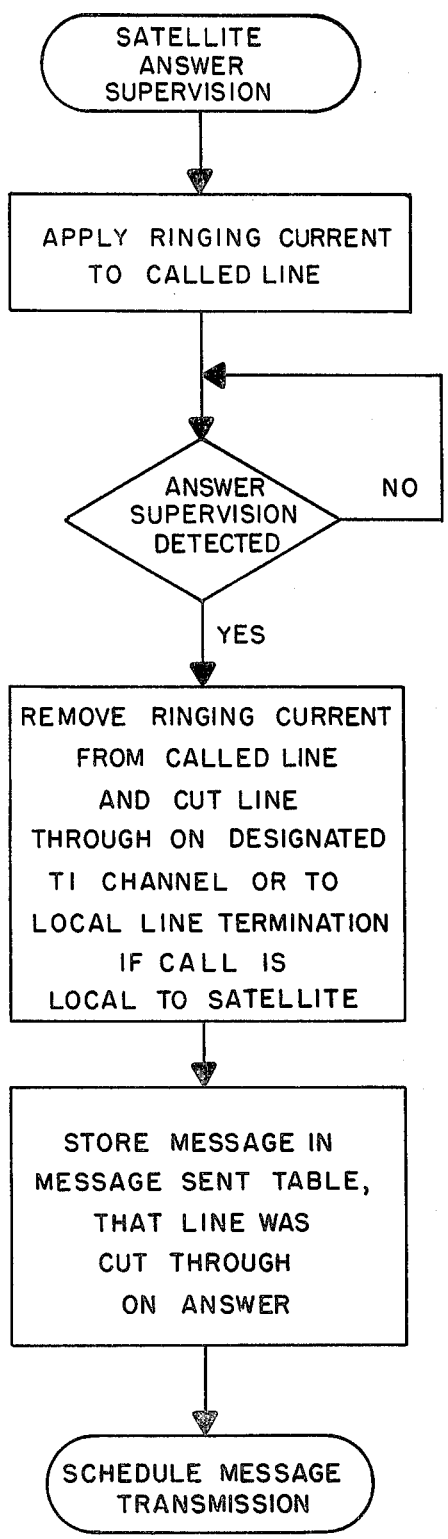
Figure 8:
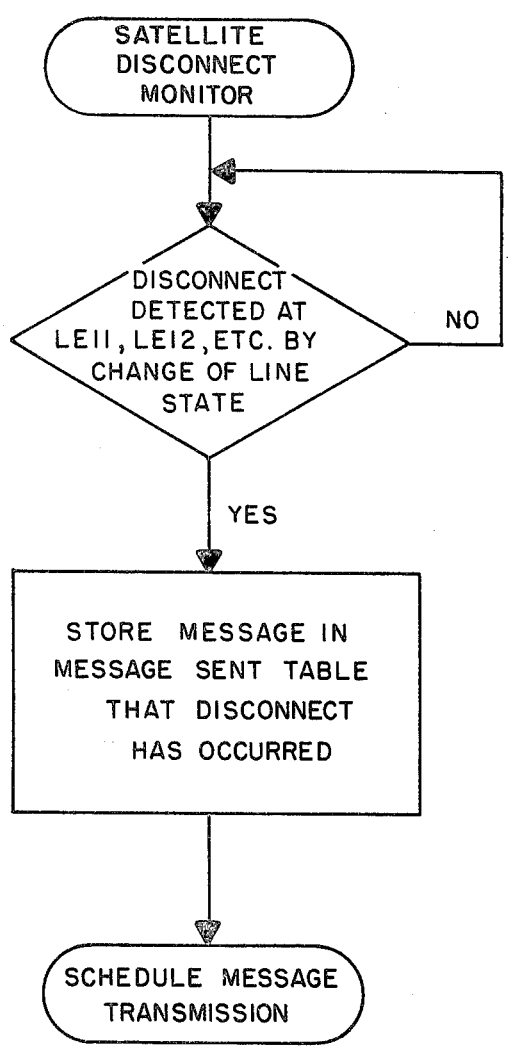
Figure 9:
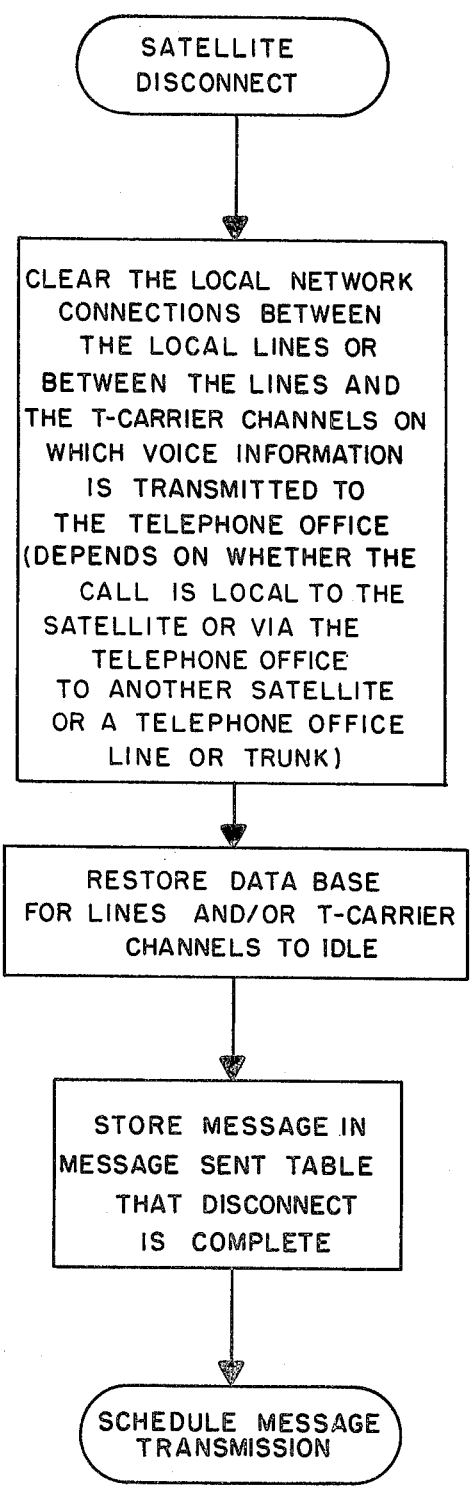
Figure 10:
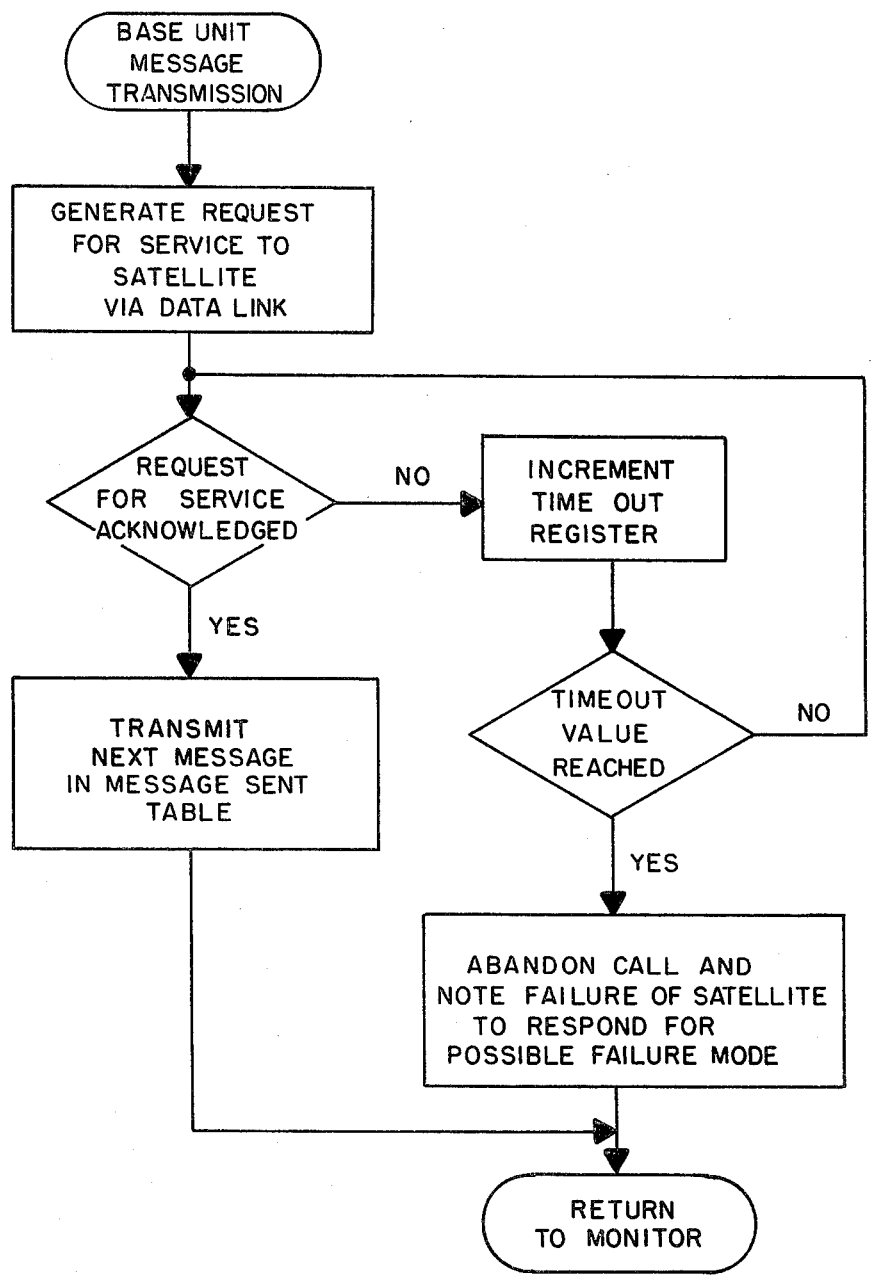
FIGS. 10–22 are flow charts showing the software operations of the base unit telephone office shown in FIG. 1.
Figure 11:
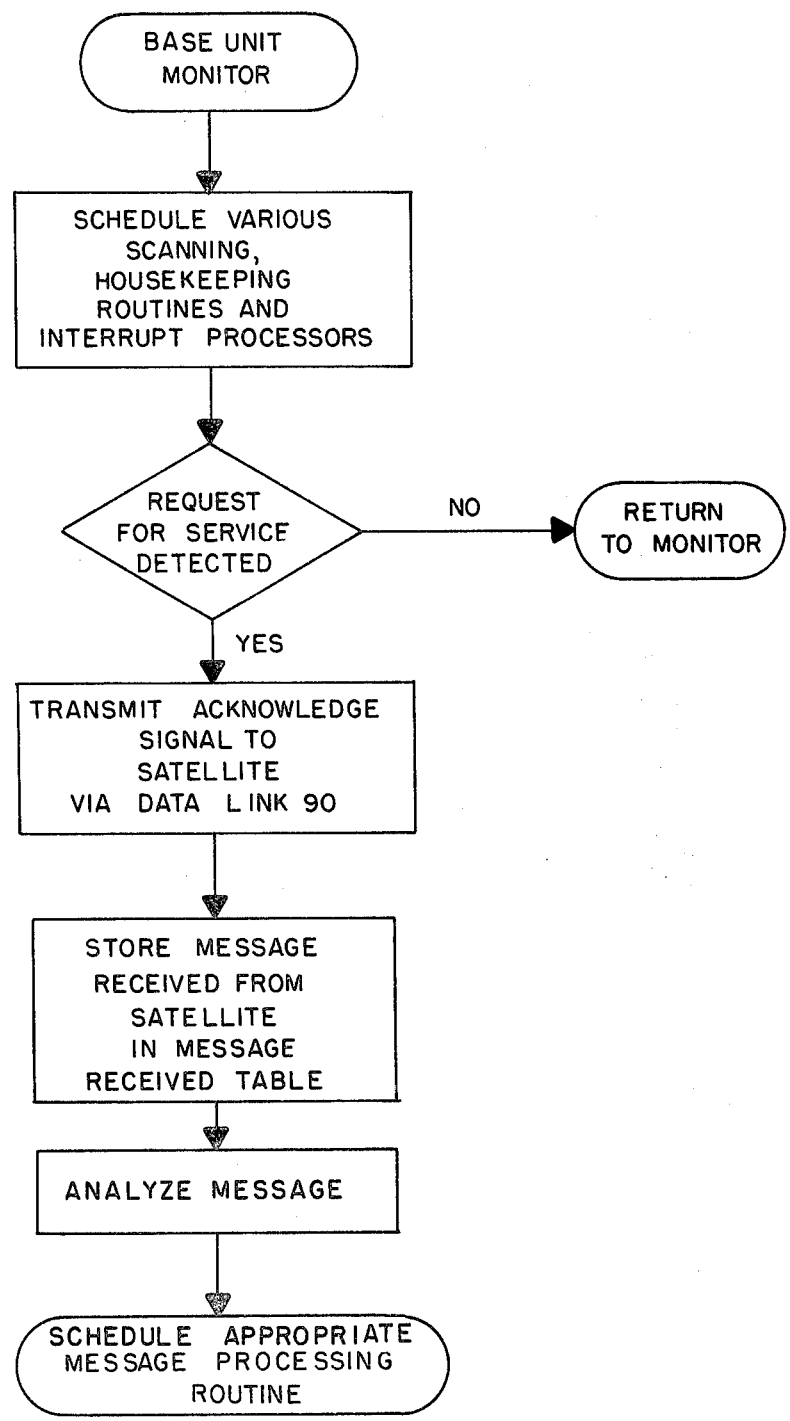
Figures 12, 13:
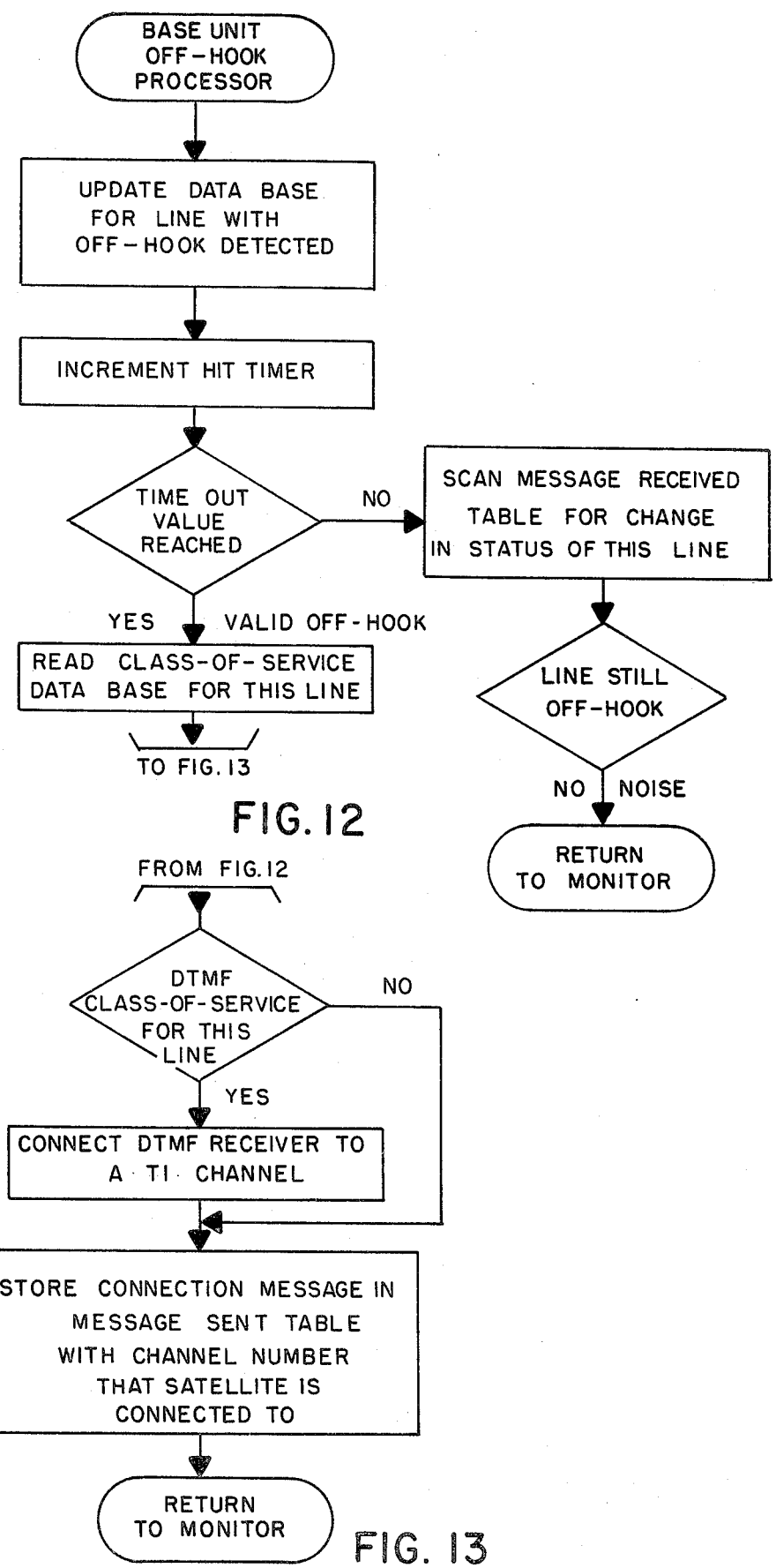
Figure 14:
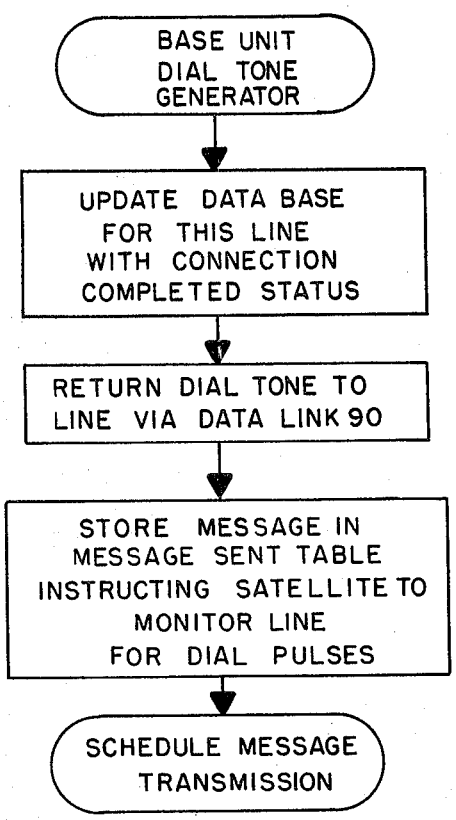
Figure 15:
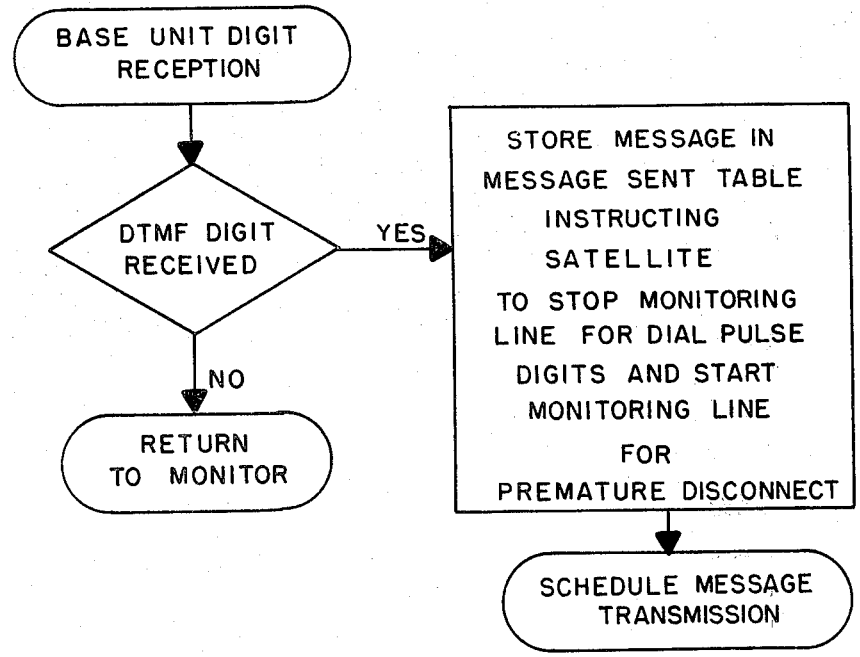
Figure 16:
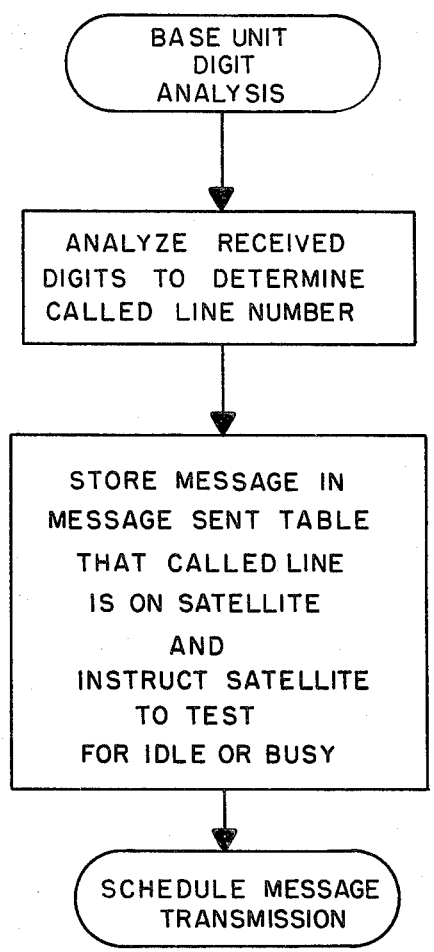
Figure 17:
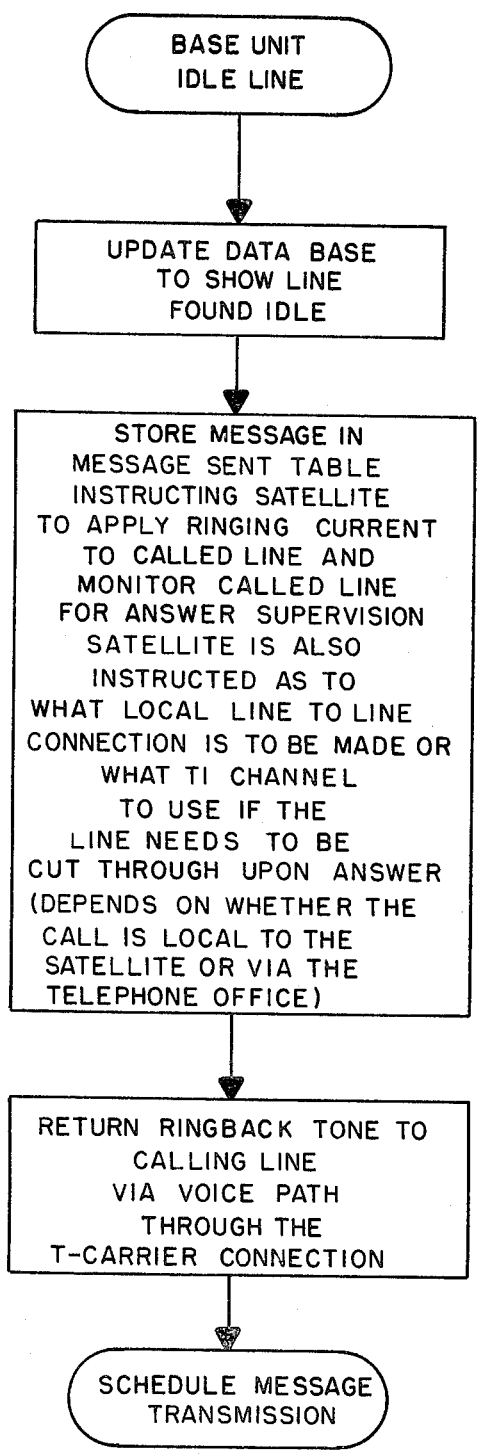
Figure 18:
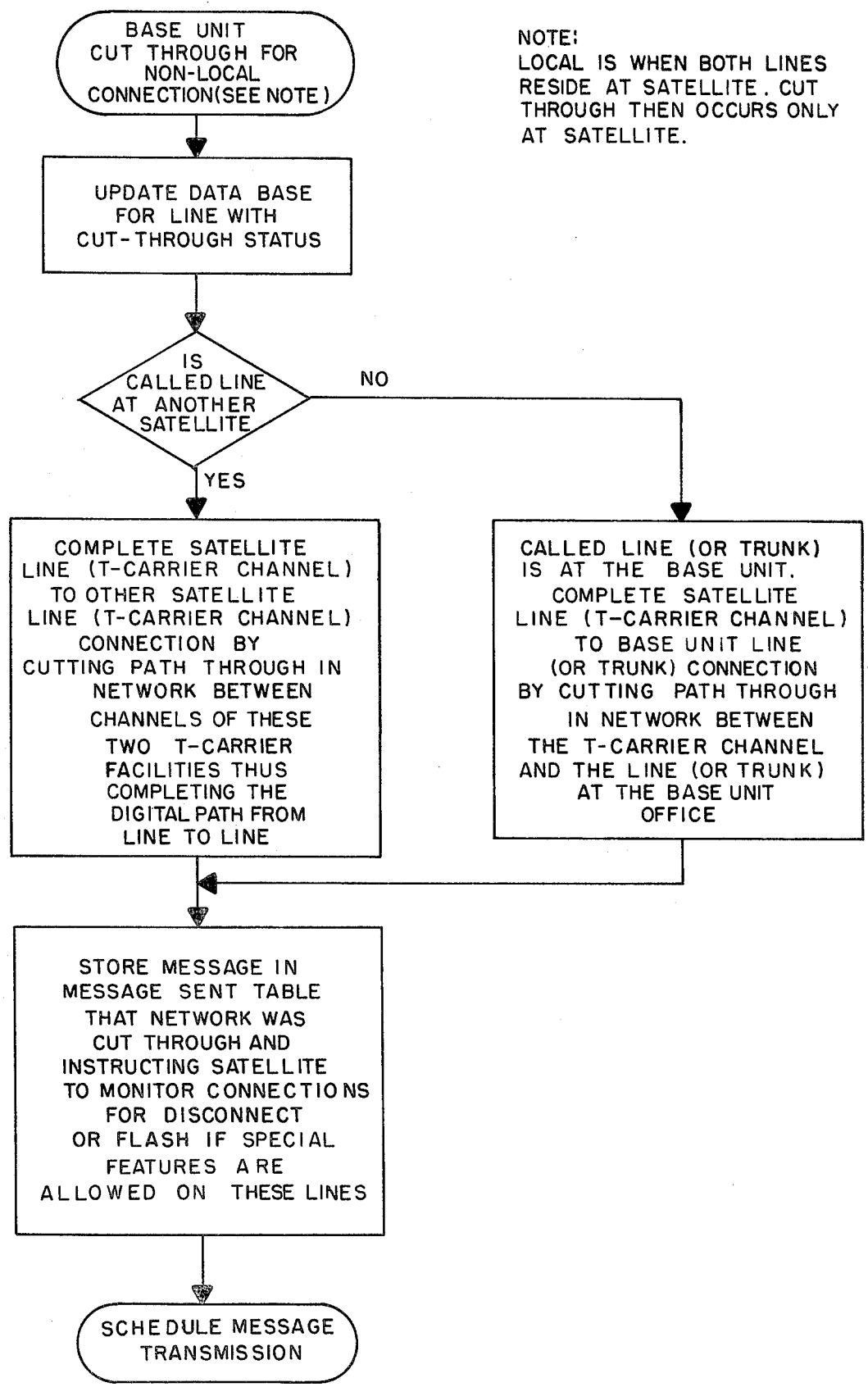
Figure 19:
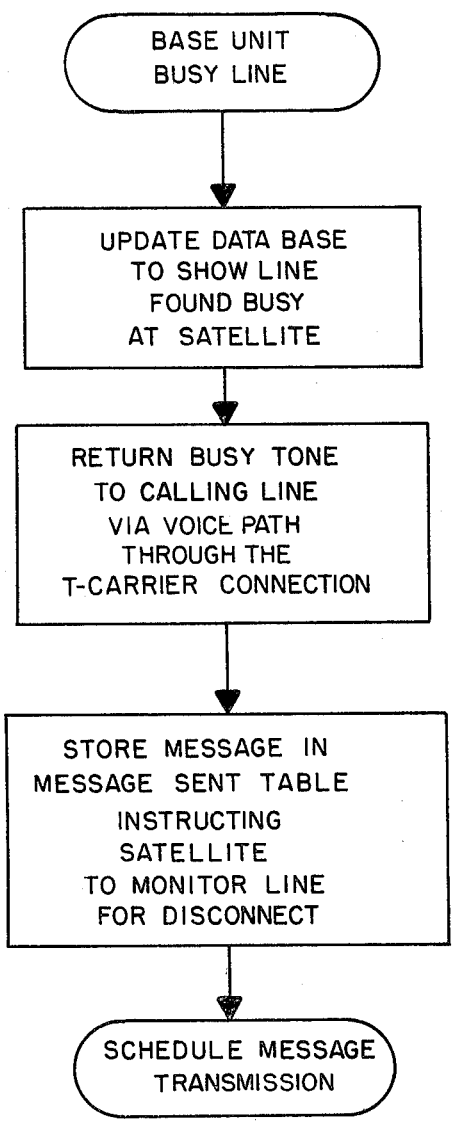
Figure 20:
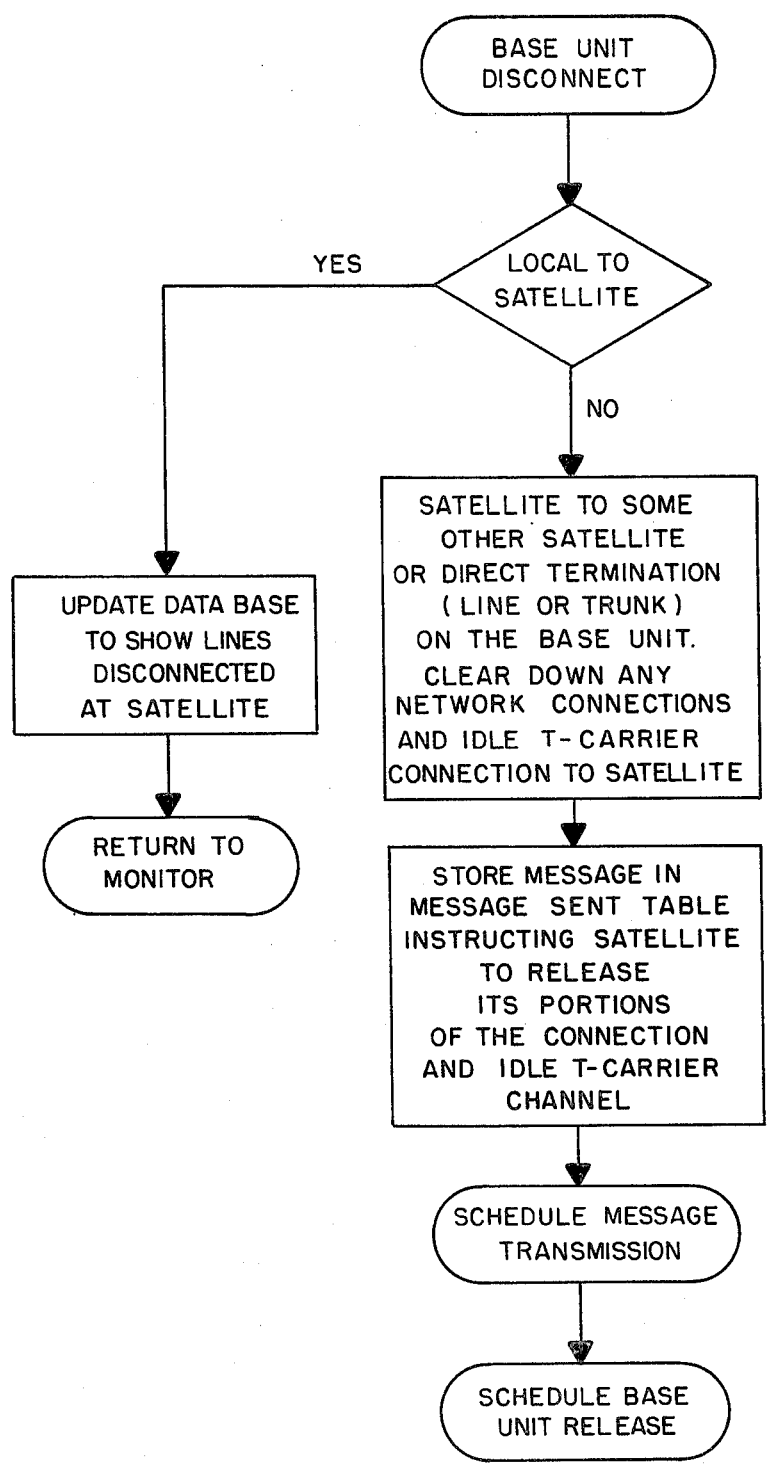
Figure 21:
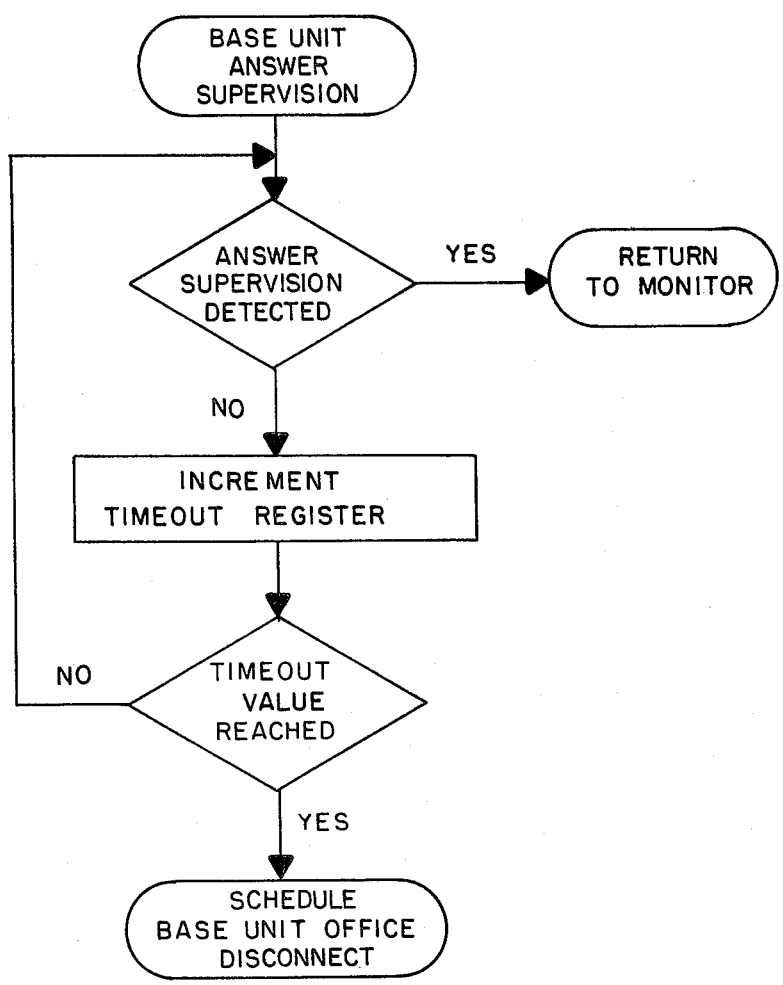
Figure 22:
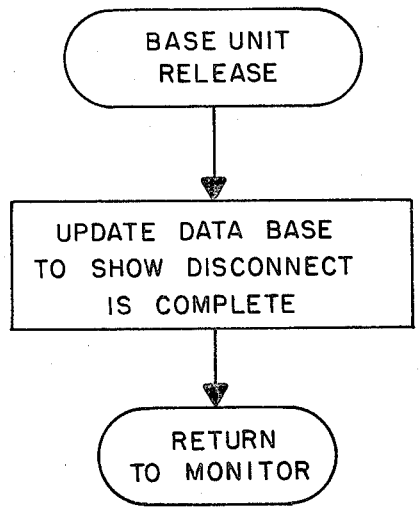

Referring now to FIG. 1, the digital satellite telephone communication system of the present invention is shown connected to a plurality of subscriber stations. Digital network 20 is shown connected to the subscriber stations via associated line circuits 10. Line circuits 10 are also connected to processing unit 30 which is further connected to data link 50. Digital trunk 40 is connected to digital network 20 and data link 50 which is further connected to unipolar/bipolar converter 60. Similarly in the class 5 telephone office data link 80 is connected between converter 70 and digital trunk 90 which is further connected to processing unit 100. Unipolar/bipolar converter 60 of the satellite office is further connected to unipolar/bipolar converter 70 of the class 5 telephone office. Line circuits, digital networks, digital trunks, unipolar/bipolar converter circuits, and processing units are well known in the field of digital telephone offices.

The operation of the present invention will be described with reference to line equipment 11 and its associated subscriber station since the operation is similar for all subscriber stations. When subscriber station 1 goes off-hook, associated line circuit 11 detects this condition and signals processing unit 30. Processing unit 30 identifies the line and transmits this information as a request for service to data link 50. Data link 50 inserts the identified line and request for service information in a 4 KHz channel included in the T1 line transmitted by digital trunk 40. Unipolar/bipolar converter 60 converts the T1 line data, with included 4 KHz channel, from the unipolar format used in the satellite telephone office to the bipolar format used for transmission between telephone offices.

In the base unit telephone office, unipolar/bipolar converter 70 converts the T1 line data from unipolar to bipolar. Data link 80 extracts the 4 KHz channel data, from the T1 channel data, for use by processing unit 100. Processing unit 100 determines the class of service and any required call origination functions and transmits this information over a second 4 KHz channel to the satellite telephone office via data link 80 and converters 60 and 70. Data link 50 retrieves the 4 KHz channel information from the base unit telephone office and transfers it to processing unit 30. Processing unit 30 then performs the instructed operations cush as coin detection or connecting a TCMF receiver to the off-hook subsrciber station. Similar communications are made, upon digit collection, between the satellite office and the base unit office which determines routing. Upon such determination the base unit processing unit instructs the satellite processing unit to connect either to a local subscriber station or to maintain the trunk connection to the base unit telephone office for connection to a remote subscriber station. The originating subscriber station then transmits to the termination subscriber station via the digital network and digital trunk. Upon termination of the call, by either the called or calling subscriber going on-hook, the satellite processing unit disconnects the local subscriber stations from digital network 20.

If the communication link between the satellite office and the base unit office is interrupted the satellite office can still provide local switching service for connected subscribers since the minimal call processing and memory requirements for such minimal service can be economically provided in a satellite telephone office.

As previously described, data links 50 and 80 operate to transmit call processing signals between the processing units of the satellite and base unit /telephone offices. These data link circuits do this be inserting the call processing signals in, or retrieving them from, a 4 KHz channel included in the T1 line connecting the satellite office to the base unit office.

Data link 50 includes Universal Synchronous Asynchronous Receiver Transmitter (USART) 51 which is operated in the synchronous mode. It is shown connected to processing unit 30. USARTS are old and well known. A typical example is Intel's 8251A. Gate 53 is connected to USART 51 and digital trunk 40. Gate 52 is connected to digital trunk 40 and gate 54, which is also connected to gate 53. Gate 54 is further connected to unipolar/bipolar converter 60. Gates 55 and 56 are connected to unipolar/bipolar converter 60. Gate 55 is further connected to digital trunk 40 and gate 56 is connected to USART 51.

USART CONNECTIONS

The connections shown for USART 51 are those used for the Intel 8251A. As shown, the serial Data In (DI) and Data Out (DO) signals appear on the RXD and TXD leads respectively. The FS signal is applied to both the transmitter and receiver clock (TXC and RXC) leads. An interval clock signal clock signal having frequency 16 times that of the FS signal is applied to the CLK lead. This interval clock signal provides sufficient clock pulses to USART 51 to allow it to perform the necessary logic functions required for each data transfer associated with a corresponding FS signal. Read and write commands are applied by processing unit 30 to the RD and WR leads, respectively. The read command is applied in response to detection of a receiver ready signal on the RXRDY lean and the write command is applied in response to detection of a transmitter ready signal on the TXRDY lead.

For the satellite office to transmit call processing signals to the base unit office, processing unit 30 transfers 8 bits of data, D0–D7, in a parallel mode, to USART 51 by executing a write (WR) command. USART 51 will then sequentially apply each bit received from processing unit 30 (D0–D7) to the data out (DO) lead upon each occurrence of the FS signal from digital trunk 40. The FS signal is generated by digital trunk 40 during the 193rd bit position of each even numbered frame of 192 bits (24 channels of 8-bits each). Gate 53 then gates each DO bit to gate 54 during each FS signal. Since gate 52 is enabled by $\overline{FS}$, it will gate all of the T1 channel signals from digital trunk 40 to gate 54 except when the FS signal occurs. Consequently gate 54 performs the OR function of combining the DO signals which occur when FS is true with the T1 signals which occur when FS is not true. Thus the DO signals are inserted in the T1 line in the FS bit position which occurs in alternate frames. Since each T1 frame has a 125 microsecond duration, the FS signal occurs every 250 microseconds and thus represents a 4 KHz channel included in the satellite unit (SU) T1 channel.

Similarly for the base unit telephone office to transmit call processing instructions to the satellite telephone office T1 channel signals are transmitted to data link 50. Gate 55 transfers all of the T1 bits to digital trunk 40 unless the FS signal is true since gate 55 is enabled by $\overline{FS}$. When the FS signal is true gate 56 gates the call processing instruction bit transmitted at that time to UART 51. Thus the call processing instruction signals are retrieved from the 4 KHz channel included in the T1 line. UART 51 will sequentially store 8 of these bits, whereupon processing unit 30 can retrieve them by executing a read (RD) command.

Data link 80 operates in an identical manner to retrieve the call processing signals from, and insert the call precessing instructions in the 4 KHz channel included in the base unit (BU) T1 channel.

Rural telephone subscribers are thus provided with full feature telephone service through use of a satellite telephone office connected to a base unit telephone office. The satellite office can provide local switching independent of the associated base unit telephone office but it can also provide full feature services through communication with the associated base unit telephone office.

SOFTWARE OPERATIONS

The software operations of the satellite telephone office are described in the flow charts of FIGS. 2-9 while the software operations of the base unit telephone office are shown in FIGS. 10-22.

It will be obvious to those skilled in the art that numerous modifications of the present invention can be made without departing from the spirit of the invention which shall be limited only by the scope of the claims appended hereto.

What is claimed is:

1. A satellite digital telephone system including a satellite digital telephone office, said office including a plurality of line circuits, a first digital network operated to generate a first plurality of parallel date groups, and a first processing unit operated to generate digital data respresentative of the status and identity of said line circuits, said satellite telephone system comprising:

a first digital trunk connected to said first digital network operated in response to said first parallel data groups to periodically generate alternately occurring first and second serial data streams, each comprising said first plurality of parallel data groups, said digital trunk further operated to generate a first terminal framing bit and concatenate said first terminal framing bit to each of said first plurality of data streams;

first data link means connected to said processing unit and to said digital trunk, operated in response to said digital data from said processing unit to concatenate each successive one said second plurality of data streams; and first polarity conversion means connected to said first data link means operated in response to said first and second pluralities of data streams to generate bipolar signals representative of said first and second pluralities of data streams.

2. A satellite digital telephone system as claimed in claim 1, wherein: said satellite digital telephone office is connected to a base unit telephone office.

3. A satellite digital telephone system as claimed in claim 2, wherein said base unit telephone office comprises:

second polarity conversion means connected to said first polarity conversion means operated in response to said bipolar signals from said first polarity conversion means to generate unipolar signals representative of said first bipolar signals;

second data link means connected to said second polarity conversion means, operated in response to said first unipolar signals to retrieve each bit of said digital data representative of the status of said line circuits, from said second plurality of data streams; and a second processing unit connected to said second date link means operated in response to said retrieved line circuit status bits to generate line circuit control bits.

4. A satellite digital telephone system as claimed in claim 3, wherein said base unit telephone office further includes a second digital network operated to generate a second plurality of parallel data groups, said base unit telephone office further comprising:

a second digital trunk connected to said second digital network, operated in response to said second parallel data groups to periodically generate alternately occurring third and fourth serial data streams, each comprising said second plurality of parallel data groups, said second digital trunk further operated to generate a second terminal framing bit, and concatenate said second terminal framing bit to each of said third plurality of data streams;

said second data link means further connected to said second digital trunk, operated in response to said line circuit control bits to concatenate each successive one of said line circuit control bits to each successive one of said fourth plurality of data streams; and said second polarity conversion means further operated in reponse to said third and fourth pluralities of data streams to generate bipolar signals representative of said third and fourth pluralities of data streams.

5. A satellite digital telephone system as claimed in claim 4, wherein: said first polarity conversion means further operated in response to said bipolar signals from said second polarity conversion means to generate unipolar signals representative of said second bipolar signals.

6. A satellite digital telephone system as claimed in claim 5, wherein: said first data link means further operated in response to said second unipolar signals to retrieve each bit of said line circuit control bits from said fourth plurality of data streams.

7. A satellite digital telephone system as claimed in claim 6, wherein: said first processing unit is further connected to said line circuits, and further operated in response to said retrieved line circuit control bits to control and monitor said line circuits.

8. A satellite digital telephone system as claimed in claim 7, wherein said first digital trunk means further operated in response to said second data stream to generate a first timing pulse representative of the occurrence of the last bit of said second data stream, said first data link means comprising:

first parallel to serial conversion means connected to said first processing unit;

first gating means connected to said first parallel to serial conversion means, to said first digital trunk and to said first polarity conversion means;

said first parallel to serial conversion means operated in response to said digital data from said processing unit and each of said first timing pulses to sequentially transfer each bit of said digital data from said first processing unit to said first gating means; and said first gating means operated in response to each of said second data streams and each of said first timing pulses to concatenate each of said bits transferred by said parallel to serial conversion means, to each correspondingly occurring second data stream.

9. A satellite digital telephone system as claimed in claim 8, wherein: said first digital trunk means further operated in response to said fourth data stream to generate a second timing pulse representative of the occurrence of the last bit of said fourth data stream;

said first gating means operated in response to each of said fourth data streams and each of said second timing pulses to retrieve said line control bits from said fourth data streams;

said first parallel to serial conversion means operated in response to said retrieved line control bits end said correspondingly occurring second timing pulse to generate parallel data representative of a predetermined number of said line control bits;

10. A satellite digital telephone system as claimed in claim 8, wherein said parallel to serial conversion means comprise: a universal asynchronous receiver transmitter.

* * * * *